Figure 1:
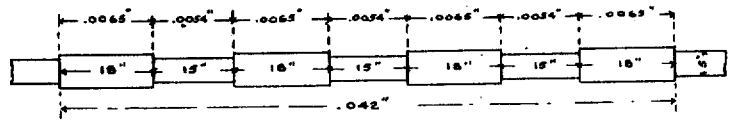

G. EDWARDS.
GEAR AND PINION TRANSMISSION.
APPLICATION FILED JULY 31, 1916.

1,320,459.

Patented Nov. 4, 1919.
2 SHEETS—SHEET 1.

INVENTOR
GEORGE EDWARDS

ATT'Y.

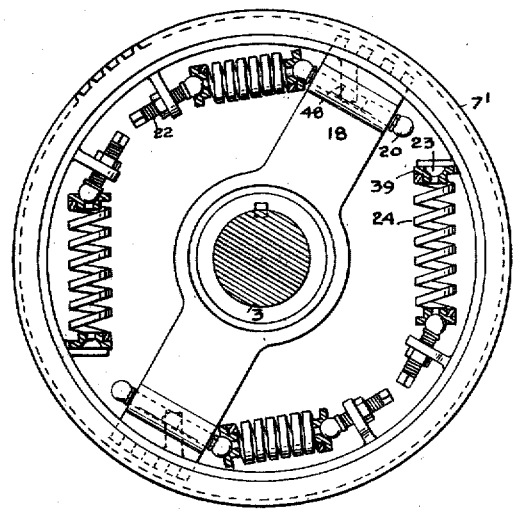
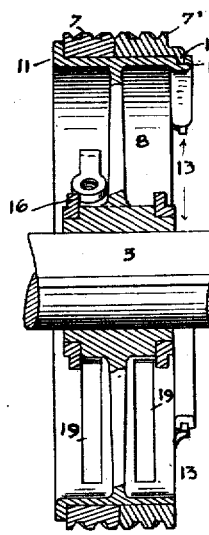
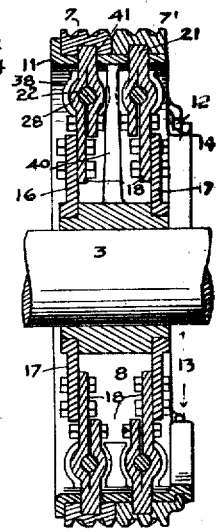
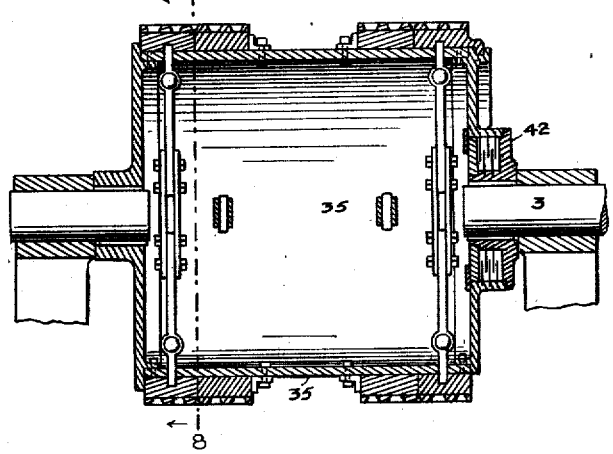
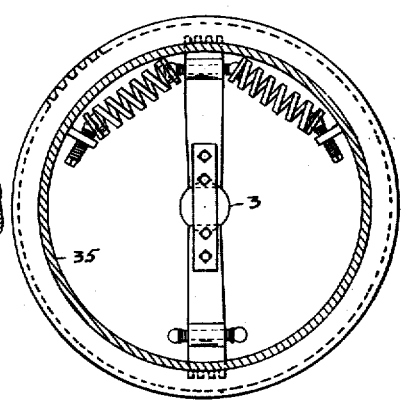
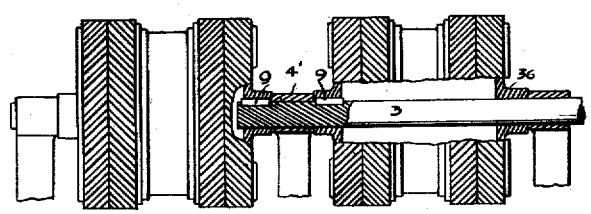
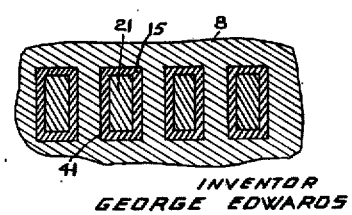
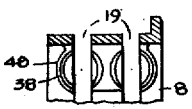
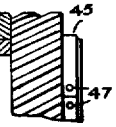

UNITED STATES PATENT OFFICE.

GEORGE EDWARDS, OF BERKELEY, CALIFORNIA.

GEAR-AND-PINION TRANSMISSION.

1,320,459.  Specification of Letters Patent.  Patented Nov. 4, 1919.

Application filed July 31, 1918. Serial No. 252,284.

*To all whom it may concern:*

Be it known that I, GEORGE EDWARDS, a citizen of the United States, residing at Berkeley, in the county of Alameda and State of California, have invented new and useful Improvements in Gear-and-Pinion Transmissions, of which the following is a specification.

These specification and drawings are intended to disclose the art of avoiding destructive stresses of torsion, when transmitting power between two shafts, by means of intermeshed teeth; and also mechanical means for applying this art. The main field lies in the use of more than two gears, or toothed means, connected with one of the shafts.

The torsion imparted to a shaft by transmitting its normal full load is usually estimated at about one degree of a circle for each ten feet of shaft. It varies, however, as the load rises above, or falls below, its normal. When such a shaft carries a pinion, which engages with a gear wheel, the torsion of the shaft is imparted to the pinion to an extent varying with the ratio of diameters. If the pinion is integral with the shaft and of the same diameter on the pitch line, the torsion of the pinion will be substantially the same as its shaft.

If we assume that the teeth of the gear wheel, that is driven by the pinion, are not twisted out of their normal direction, parallel with the shaft of the gear wheel, and are rigid; and that the pinion teeth also are rigid, except as twisted by torsion, then there will be but one point of contact between the pinion tooth and the corresponding tooth of the gear; and this point will be nearest the source of power, as this point will be advanced farthest circumferentially by the torsion.

This, however, in actual practice, is not the case, for the reason that the pinion and the gear teeth are not rigid, but elastic. Pressure, therefore, between the pinion and the gear teeth, may take place up to the elastic limit. If the contact pressure is carried beyond the elastic limit, one or both teeth must be bent or broken.

The pressure of the pinion tooth upon the corresponding face of the gear tooth varies with the extent to which the teeth are elastically bent backward, and decreases, owing to torsion, with the distance along the shaft from the source of power. And as there is a resilient limit to the angle through which the teeth in contact can be safely bent backward, it follows that there is a limit also to the length of face of the teeth, beyond which no advantage is gained. In practice, this limit appears to be about eighteen inches. The pressure of the pinion tooth upon the gear tooth diminishes with the distance from the point of contact nearest the source of power to a point about eighteen inches therefrom, and it is not considered good practice to push it farther; for little is to be gained in extending the width of face to the vanishing point of power transmission.

Owing to this torsion and to the resilient limit of the teeth in contact, there has been a limit, heretofore, to the amount of power that can be transmitted safely by a single pinion and gear. And owing to lack of accommodation for torsion, it has not been possible, heretofore, to use a succession of pinions of the maximum possible length; with the exception of the special case of right and left helical teeth, which enable the practical limit to be doubled, because the torsion causes a sliding longitudinal adjustment, owing to the wedge action of the teeth, and both right and left portions of the teeth are enabled to transmit substantially an equal amount of power.

The most important application of my gear and pinion is in their use with steam turbines for marine propulsion. Such turbines are most efficient when running at a very high speed, while the marine screw is most efficient at a comparatively low speed.

It has been found by careful tests that the gear and pinion will give an efficiency of 98% in transmitting large powers, where a pinion tooth length of more than about eighteen inches is not required. The best of other devices for transforming speed of rotation give an efficiency of but about 90%. Thus the gear and pinion will save about 8% in fuel over the best of other devices, provided that all the other elements that enter into fuel consumption are exactly equal.

Furthermore, the efficiency of a steam turbine increases rapidly with the amount of its horse-power. The development of marine practice, therefore, should be in the direction of concentrating all the power in a single turbine, rotating at its most efficient speed, and transmitting its power to any desired number of screw shafts.

It is the object of my invention to retain the above large efficiencies of pinions and turbines by enabling the gear and pinion to transmit power of any amount. Instead of limiting the power delivered by one pinion shaft to about 3000 horse-power, as is usual in present practice, I purpose to use a single pinion shaft to transmit up 50000 horse-power, and beyond that amount, if required.

The amount of circumferential displacement of the gear and pinion teeth, by torsion, which should be adjusted for by the flexibility of the teeth, or by some other means, will vary directly with the diameter of the shaft; if the pinion has the same torsion as its shaft. If the diameter of the pinion shaft is doubled to transmit four times the power, the circumferential displacement will be doubled in amount, and if the amount of torsional displacement that is compensated for by the elasticity of the teeth is held as a constant, the width across the face of the gear and pinion must be reduced one-half. This condition that the width of the working face must be reduced as the power transmitted increases, is one of the sources of difficulty in the application of the gear and pinion for transmitting high powers under former designs.

The adjustment required for torsion will become clear if we take the example of a pinion shaft 5 inches in diameter and assume that the pinion has substantially the same diameter and the same torsion as its shaft. If the pinion is 18 inches wide, there will be .0065 inch torsion across the face of the pinion under normal full load. If we introduce an intermediate shaft for a bearing 15 inches long and divide the pinion into two segments, each 18 inches long, on each side of the bearing, giving a total length of 51 inches, the torsion will be .0184 inch. If the same dimensions are maintained and 3 intermediate bearings are used, and 4 pinion segments, giving a total length of 97 inches over all, the total torsion in this length will be .042 inch.

Furthermore, if we assume in the above illustrations that the gear shaft is carrying its normal load and that the gear segments are each carried on a separate drum, there will be a displacement in the gear faces, due to torsion in the shaft, in the ratio of diameters of the pinion and gear. If this ratio is 10 to 1 the torsion of the gear face will be .42 inch.

Obviously, such variations as these are more than sufficient to cause destructive stresses in the teeth of a gear and pinion when transmitting high power, unless compensated for.

My invention gives perfect accommodation for torsion and enables the load to be distributed equally across the face of the gear and pinion. It enables the correct contact pressure on gear and pinion teeth to be standardized, so that in designing gears and pinions the correct width will be the total power transmitted at the required face speed multiplied by the standardized pressure per inch of face.

I gain an additional advantage by interposing elastic means through which power is transmitted between the pinion and the gear shaft, which will absorb shock and vibration, that are especially marked in the marine screw shaft and in rolling mills. It also tends to smooth and quiet running.

Figure 2:
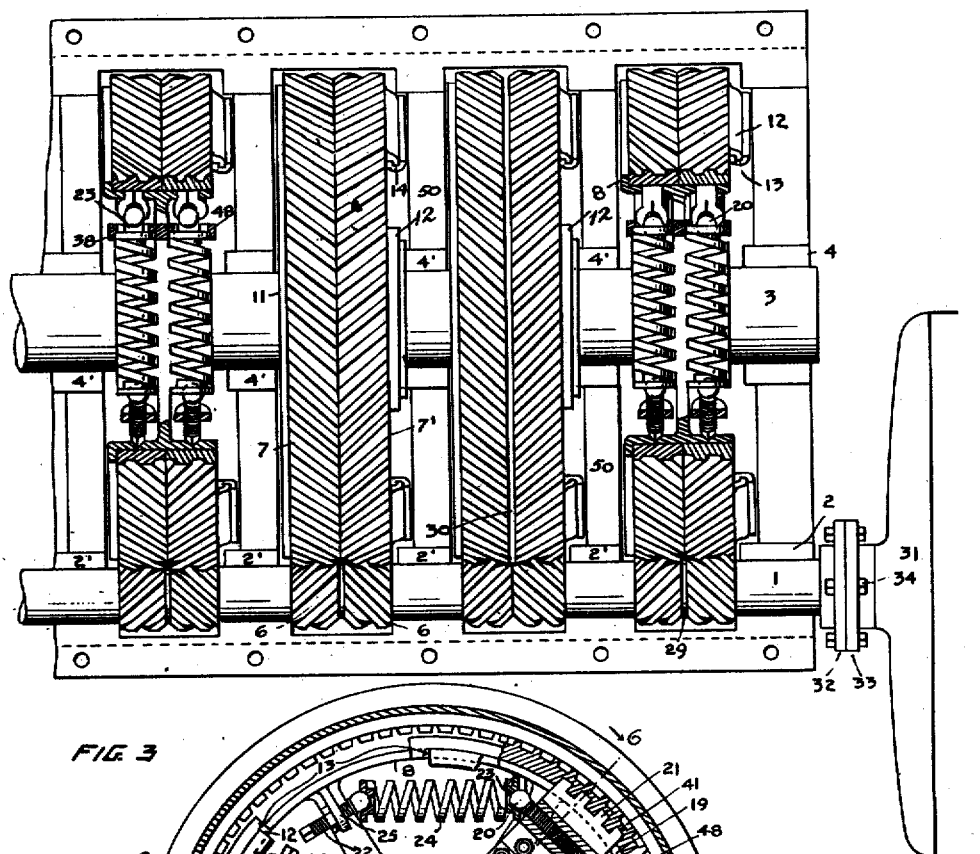
Figure 3:
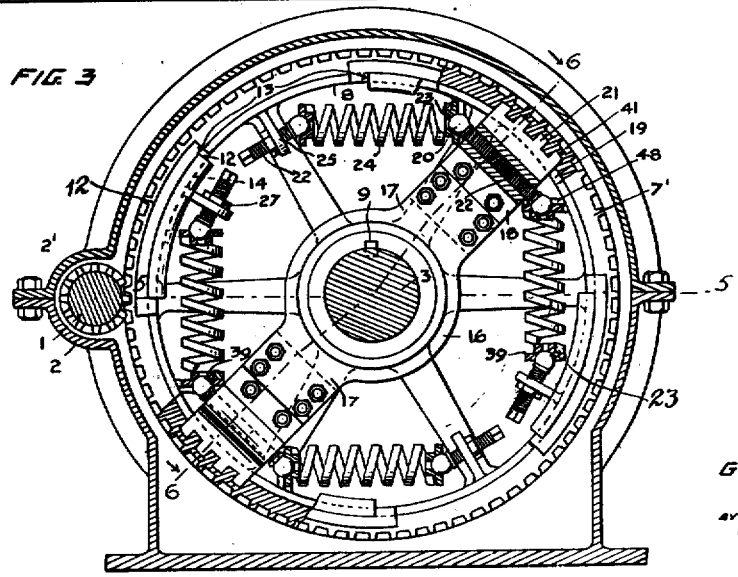

In the accompanying drawings, Figure 1 is a diagrammatic view illustrating the torsion of a shaft and pinions, under full loads, the pinions offering the same resistance as the shaft; Fig. 2 is a broken plan view, the casing being removed, of driving and driven shafts and pinions and gears thereon, with a detachably connected steam turbine; Fig. 3 is a transverse sectional view; Fig. 4 shows part of the power transmitting mechanism in a different position from Fig. 3; Fig. 5 is a section on the line 5—5 of Fig. 3, the pinion being omitted; Fig. 6 is a section on the line 6—6 of Fig. 3; Fig. 7 shows a different form of drum from Fig. 2, partly in cross-section and partly in plan view; Fig. 8 shows a cross-section of Fig. 7 on the line 8—8, and part of the power-transmitting mechanism; Fig. 9 is a broken plan view of two drums of the type shown in Fig. 7; Fig. 10 is a cross section of an alternative method of connecting part of the power-transmitting mechanism; Fig. 11, partly in plan and partly in cross section, shows seats for the springs when at rest; Fig. 12 shows an alternative means for holding part of the mechanism in working position.

Referring to the drawings, 1 indicates a pinion shaft, rotatable in bearings 2 and 2', and 3 a gear shaft rotatable in bearings 4 and 4'. The gear bearings are supported by arms 50. In Fig. 2 the upper bearings are removed and the lower bearings only are shown.

Integrally with said shaft and located between bearings are formed right and left helical pinions 6, which engage right and left helical gear rings 7 and 7', one ring being operatively displaceable circumferentially relatively to another ring, and also relatively to the surface of the drums 8 which are keyed to the gear shaft, as shown at 9. I mean such power-transmitting means as these gear rings and the supporting drums and the variations of construction which I shall indicate, or their equivalents, by the phrase, in the claims "a portion of the power-transmitting means of said second shaft being operatively displaceable circumferentially relatively to the remainder," referring to one segment of a power-transmitting peripheral face relatively to another segment and both segments being operatively connected with the first shaft for transmission of power between said two shafts. By the phrase "operatively displaceable circumferentially relatively to the remainder," as used in my claims, I do not mean the slight distortion of teeth and metal across the face of a gear ring, or its equivalent, or in any of the solid transmitting parts, under the stress of the load and torsion.

It is obvious that the two shafts 1 and 3 may be more widely separated and the power-transmitting peripheral faces of the pinions and of the gear rings be modified, so that power may be transmitted from one shaft to the other by any kind of belting, or equivalent means. Intermeshing teeth, with the operative means by which said power-transmitting faces are operatively connected with their respective shafts, is what I mean by the phrase power-transmitting rotary means operatively connected with the first shaft, power-transmitting means operatively connected with the second shaft, as used in my claims.

One gear ring 7 is moved in an axial direction to position on said drum and abuts upon an outwardly extending flange 11 of said drum, the other gear ring having inwardly extending arcuate ribs 12, which can slide axially into recesses 13 on the drum, and then may be turned circumferentially to enter circumferential grooves 14 in the drum, which retain the ring in its operative position. The number of such ribs is limited only by the requisite supports and the operative play of the gear rings on the drums. It is obvious that the faces of the drums may be wider and one or more additional gear rings be placed between the two rings indicated on a single drum, (Fig. 2).

Rotatably mounted on the extremities of the hub of the drum are circular yokes 16, from which extend, preferably two plates 17, to which are bolted arms 18, which extend through circumferential slots 19 in the drum and have on their outer ends fingers 21, which enter corresponding recesses 41 in the inner side of the gear rings. Careful fitting to a bearing may be avoided by making the recess 41 larger than the fingers 21, and by filling the space with Babbitt or the like metal 15, as shown in my Fig. 10. The arm 18 carries a ball 20 supported by a threaded extension 22 that is inserted in the arms 18. The ball enters a socket 23 in a carrier 39 for one end of a spring 24. The opposite end of the spring is carried by a corresponding socketed support and ball 25, attached to the drum 8 to transmit power to or from the shaft 3.

The balls are adjustable, so that each spring, having been tested separately and its exact length measured at full load, may be set to carry its exact share of the full working load by compensating for the distortion caused by torsion, at the point where each spring is located, and also to adjust for any lack of uniformity between the springs. When the balls are properly adjusted to position, they may be held in place by a binding nut 27, or by a clamp 28, or like device. If the motion of the pinion and gear is intended to be reversible, a like construction of balls, sockets, springs and connections therewith, may be used to transmit the load. When the springs are at rest they are supported (Figs. 2 and 11) in a recessed support 38 for the spring carrier 39, the support being attached to the drum. The support 38 may be movably attached to the drums and so permit adjustment for variations in the springs from the desired tension.

In the application of the springs, two methods are available: (a) all the springs may have the same length without load and have the same flexibility; (b) all the springs may have the same length without load, but gradually increase in stiffness according to location in the same ratio with the increase of displacement by torsion, which may be done easily by gradually diminishing the diameter of the coil from one spring to another. These two methods permit of scientific precision, but, of course, the method of applying the springs may be varied indefinitely.

To illustrate the methods (a) and (b), let it be assumed that the gears in Fig. 2 have a large diameter and that the maximum torsion is 2 inches; and that the gear rings are displaced 6 inches from their at-rest position by the pinions in bringing the springs to full load. Let us assume, for clearness of illustration, that the pinion shaft is without torsion. Let the power be delivered to the pinion shaft on its right end and the gear deliver its power at the left end. In case (a) let the ball 20 be in full contact with its spring socket on the right-hand gear, and in the left-hand gear let the ball be separated 2 inches from its spring socket 23. When the pinions have displaced the gear rings 2 inches, the ball on the left will have reached its socket, but the spring will be without load. On the right, however, the ball will have compressed its spring 2 inches, or to one-third load and one-third of the torsion will have developed. When the pinions have displaced the gear rings 4 inches more, the spring on the left will have risen from no load to full load, and the spring on the right will have risen from one-third load to full load, and the full torsion of 2 inches will have developed. In case (a) all the springs compress 4 inches. The remaining 2 inches of gear ring displacement is made up on the left by free play of the ball, and on the right by torsion. The same principle holds with the intermediate springs, balls and sockets.

In case (b) all the balls are fully seated in their spring sockets when at rest. When the pinions have displaced the gear rings 6 inches from the at-rest positions up to full load, the spring on the left will be compressed 6 inches, while the spring on the right, being stiffer, will be compressed but 4 inches, and the remaining 2 inches will be made up of the torsional displacement.

It is obvious that the equalizing element is of such construction that the designer may incorporate a margin of safety, so that, on failure of some of the gear rings, up to the limit of such margin, the load will be carried safely by the remaining gear rings.

To automatically adjust for accidental errors in longitudinal alinement, I cut out a minimum space of the teeth 29 at the vertices of the right and left helices of the pinion, or of the teeth 30 of the gear rings, so that the gear segments may automatically adjust themselves properly.

In Fig. 2 the end of a steam turbine casing is indicated by 31 and one end of its shaft is detachably connected to the pinion shaft 1 by the coupling 32 and 33 connected by bolts 34.

Figs. 7 and 8 show a different form of drum, in which the shell of the drum 35 transmits the load to its operative shaft 3. The purpose of this construction is to reduce torsion to a minimum, or to cheapen construction. If the load requires the use of two such drums (Fig. 9), they may be placed on each side of an intermediate bearing 4' and both be keyed to the shaft 3 in juxtaposition to this bearing. The end 36 of the second drum is supported by the shaft 3 but is not keyed thereto. In Fig. 7 the cross-bar of one ring is at right angles to that of the next ring. The word "keyed" is intended to cover any rigid connection. The form of the drum shown in Fig. 7 may also be used to carry but a single group of power-transmitting rings, the number of such rings being indefinite. If the number of rings is odd, this construction has no intermediate spokes to interfere with the cross-bars and springs.

The operative circumferential displacement relatively to the supporting element of the power-transmitting means of shaft 3 will vary according to the construction. Obviously the gear key 9 may be removed and the ball 20 be connected with an arm that is keyed to the shaft 3. In this case displacement might take place on the shaft, or on the drum, or on both. Or, the shaft might be surrounded by a bushing, or by a series of superimposed bushings, supporting the drum, or the drum might be supported by a friction clutch 42, Fig. 7, and the displacement be divided among all these supporting elements.

For clearness, I show most of the available interior space of the gear (Figs. 3 and 4) occupied by four springs and their connections, but, in practice, this will be the case only with small gears.

By the phrase "resiliently connected with the second shaft" as used in the claims, I mean the interposition of a resilient or elastic element through which the power is transmitted, and that this resiliency or elasticity is greater than, or in addition to, the slight resiliency or elasticity that is normally present in the teeth and in all the metallic parts of an ordinary gear keyed to its shaft, or its equivalent, in a solidly connected construction.

The operative circumferential displacement of the power-transmitting faces, relatively to the supporting element, may be resisted in a variety of ways, but springs have the merits of reliability, cheapness, elasticity, and perfect adaptability to any desired number of intermediate bearings for either shaft.

If the means by which the operative circumferential displacement takes place is inelastic, it can easily happen that one of the faces may not be operatively displaced, and that the displacement takes place relatively to the remaining faces, and to the supporting element.

When the means for compensating for torsion is inelastic, the circumferential displacement of one power-transmitting face relatively to another face and relatively to the supporting element is mainly a correction for torsion. When an elastic element is used, as shown in my drawings, there is added a displacement relatively to the supporting element due to the elasticity of the means through which the power is transmitted. My claims are intended to cover the first case; and, also the second case combined with the first, if used.

1000 pounds per inch is considered as about the safe maximum for tooth operation for contact pressure between gear and pinion, when freed from the weakening effect of torsion. It follows, therefore, that this pressure, multiplied into the width of the face of a gear ring, will give the maximum load placed upon the springs. This load never rises above a moderate burden for two springs, although more springs may be nested together and used if preferred.

By keeping the pinion at about the same diameter on its pitch line as its shaft, the diameter of the gear is kept at a minimum.

My preferred construction is to use, for gear and pinion, right and left helical teeth, slanted so as to press the operatively displaceable gear rings together when on the forward rotation. On the reverse rotation, usually at not over half power, the rings will be pressed against their side supports.

My construction is such that the torsion of the gear shaft, or of the gear drum, does not distort the gear teeth, although, of course, they are operatively displaced circumferentially relatively to the supporting element and to each member of the series of gear rings by such torsion and by the elasticity of the springs. And it is obvious that my correction for torsion is by the segmented, or step by step, process. Between the steps, I rely on the elasticity of the teeth for adjustment.

Power may be imparted from the drums through a friction clutch, if it is desired for any special purpose. A conventionalized clutch is shown at 42 in Fig. 7.

If preferred, the power rings may be held in position as shown in Fig. 12, the drum being grooved, and an open band 45 of cold rolled steel inserted in each recess 46 and held in position by as many countersunk bolts 47 as may be necessary.

If a pinion engages more than two gear rings, a slightly better contact will be obtained between the gear and pinion teeth, if a minimum space is cut out of the pinion, as at 29, to register with each division line between the gear rings. Only the curved roots of the pinion teeth should be cut below the face of their shaft, so that the flexibility of the teeth may not be reduced.

I give the following examples to illustrate the applications of my invention, the pitch lines of the pinions being of the same diameters as their shafts:

If 10000 horse-power at 2000 revolutions per minute is transmitted from a single pinion shaft to a single gear shaft, with speed reduction 15 to 1, with 3 feet circumference of pinion, with 80 inches of gear face, with contact tooth pressure of 688 pounds per inch, with gear rings having 10 inches across face, and 8 rings in all, carried in pairs on 4 separate drums, with 3 intermediate bearings for pinion shaft and gear shaft, with a total over all length of gear faces and intermediate bearing of 10.4 feet, and each gear ring transmitting power through 2 springs, each gear ring will transmit 6880 pounds load; each spring will carry about 3600 pounds at full load; the torsion of the pinions and their shaft will be .1 inch; the torsion of the gear teeth will be over 1.25 inch. Or, if the power is distributed from one pinion shaft to two gear shafts, using the type of drum shown in my Fig. 7, the drums facing each other instead of staggered, and the pinions having one intermediate bearing, the torsion of the pinion shaft at full load will be .05 inch, and the torsion of the drums will vary according to the stiffness given to their shells. The load on the springs may be carried by springs made of ¼ inch steel, with about 5 inches outside diameter of coil, 14 coils, free length of 20 inches and about 6 inches compression at full load.

If 20000 horse-power at 1500 revolutions per minute is transmitted from a single pinion shaft to one gear shaft, with speed reduction of 12 to 1, with 4 feet circumference of pinion, with 192 inches of gear face, divided into 24 gear rings, each ring having 8 inches across face, with 4 gear rings on each drum and 6 drums, with each gear ring transmitting through two springs, with contact tooth pressure at 572 pounds per inch, with 5 intermediate bearings for gear shaft and pinion shaft, with 22 feet over all length of gears and intermediate bearings, each gear ring will transmit 4576 pounds load; each spring will carry about 2500 pounds load; the torsion of the pinion shaft will be .29 inch; the torsion of the gear faces will be about 3 inches. Or, if the power is imparted from one pinion shaft to two gear shafts, using the type of drum shown in my Fig. 7, the pinion having two intermediate bearings of 24 inches each, the torsion in the pinion will be .16 inch, and the torsion in the gears will vary with the stiffness given to the shells of the drums. The over all lengths of the drums will be 12 feet.

There is no important gain by using the form of drum shown in Fig. 7 in preference to the drums shown in Fig. 2, as the springs can be adjusted easily to compensate for maximum torsion. The type of drum shown in Fig. 7 is better adapted to carry two sets of gear rings, with one intermediate bearing for the pinions, as giving a more satisfactory length of drum, than for a greater number of sets and bearings. Ordinarily, the construction cost will be the determining feature in a choice between the two types of drums.

If 30000 horse-power at 1000 revolutions per minute is transmitted from a single pinion shaft to two gear shafts, with speed reduction 10 to 1, with 5 feet circumference of pinion, with 252 inches of gear face, with contact tooth pressure of 786 pounds per inch, carried by 3 separate gear drums, on each of 2 gear shafts, with two intermediate bearings for the pinion shaft and each gear shaft, with 14 feet length over all of gears and intermediate bearings, with gear rings 6 inches wide and 7 gear rings to each drum, with each gear ring transmitting power through 2 springs, each gear ring will transmit 4800 pounds load; each spring will carry 2600 pounds load; the maximum torsion of the pinion shaft will be .23 inch and of the gear faces 2.3 inches.

The following illustration is given to show the gain in efficiency by the use of my invention:

In the case of a ship using 8000 horse-power on each of 4 screw shafts, let it be assumed that, if the screws are driven by 4 direct connected steam turbines, the steam consumption will be 13 pounds of steam per horse-power hour and that the screw loses 7% in efficiency by high speed of rotation. In comparison, let it be supposed that, by using my invention, a single turbine supplies the 32000 horse-power, with a steam efficiency of 8 pounds of steam per horse-power hour, that the screw revolves at its most efficient speed, that one pinion shaft transmits power to 2 intermediate shafts and that each of their intermediate shafts transmits 8000 horse-power to each of the outside screw shafts by means of my torsion compensating gears, that each toothed power transmission will entail a loss of 2%, then there will be a net gain of 4% in the 7% gain in the screw and the 3% loss in the pinion and gears; the steam gain will be .38% in efficiency; or a total of .42%. This will be the saving in full, in the space required for fuel and boilers, which may be used to earn freight money, and the construction cost in the engine room will be reduced at least one-half.

I claim:—

1. Means for transmitting power between two shafts, comprising power-transmitting rotary means, carrying teeth, operatively connected with the first shaft, more than one power-transmitting means, carrying teeth, operatively and resiliently connected with the second shaft, the first teeth intermeshing with the second teeth to transmit said power, at least one of the second power-transmitting means being operatively displaceable relatively to another and adjusting mechanism for varying the operative resistance of said resilient element, to avoid destructive stresses of torsion.

2. Means for transmitting power between two shafts comprising power-transmitting rotary means, carrying teeth, operatively connected with the first shaft, more than two power-transmitting means, carrying teeth, operatively and resiliently connected with the second shaft, the resilient element not being integral with the means that carry said second teeth, the first teeth intermeshing with the second teeth to transmit said power and at least one of the second power-transmitting means being operatively displaceable relatively to another, to avoid destructive stresses of torsion, the resilience of the equalizing element being the means for attaining the substantial equalization.

3. Means for transmitting power between two shafts comprising power-transmitting rotary means, carrying teeth, operatively connected with the first shaft, more than two power-transmitting means, carrying teeth, operatively connected with the second shaft, the first teeth intermeshing with the second teeth to transmit said power, at least one of the second power-transmitting means being operatively displaceable relatively to another and at least one coiled spring resisting said displacement, to avoid destructive stresses of torsion.

4. Means for transmitting power between two shafts, comprising power-transmitting rotary means, carrying teeth, operatively connected with the first shaft, more than one power-transmitting ring, carrying teeth, operatively connected with the second shaft, the first teeth intermeshing with the second teeth to transmit said power, a drum supporting said rings, the interior face of said drum not being in immediate contact with said second shaft, at least one of said rings being operatively displaceable relatively to said drum, to avoid destructive stresses of torsion.

5. Means for transmitting power between two shafts, comprising power-transmitting rotary means, carrying teeth, operatively connected with the first shaft, more than one power-transmitting ring, carrying teeth, operatively connected with the second shaft, the first teeth intermeshing with the second teeth to transmit said power, a drum supporting said rings, the interior face of said drum not being in immediate contact with said second shaft, said drum being keyed to its operative shaft only at one of its hubs, at least one of said rings being operatively displaceable relatively to said drum, to avoid destructive stresses of torsion.

6. Means for avoiding destructive stresses of torsion when transmitting power between two shafts, comprising power-transmitting rotary means, carrying teeth, operatively connected with the first shaft, more than two power-transmitting rings, carrying teeth, operatively connected with the second shaft, the first teeth intermeshing with the second teeth to transmit said power, a drum supporting said rings, the interior face of said drum not being in immediate contact with said second shaft, and means for substantially equalizing upon the teeth of said rings the stress caused by transmitting said power.

7. Means for avoiding destructive stresses of torsion when transmitting power between two shafts, comprising power-transmitting rotary means, carrying teeth, operatively connected with the first shaft, more than two power-transmitting means, carrying teeth, operatively and resiliently connected with the second shaft, the first teeth intermeshing with the second teeth to transmit said power, and means for substantially equalizing upon the teeth of said second means the stress caused by transmitting said power, the resilience of the equalizing element being the means for attaining the substantial equalization.

8. Means for avoiding destructive stresses of torsion when transmitting power between two shafts, comprising power-transmitting rotary means, carrying teeth, operatively connected with the first shaft, more than two power-transmitting means, carrying teeth, operatively and resiliently connected with the second shaft, the first teeth intermeshing with the second teeth to transmit said power, means for attaching a steam turbine to one of said shafts to supply said power, and means for substantially equalizing upon the teeth of said second means the stress caused by transmitting said power, the resilience of the equalizing element being the means for attaining the substantial equalization.

9. Means for avoiding destructive stresses of torsion when transmitting power between two shafts, comprising power-transmitting rotary means, carrying teeth, operatively connected with the first shaft, more than one power-transmitting means, carrying teeth operatively connected with the second shaft, the first teeth intermeshing with the second teeth to transmit said power, and adjustable mechanism for regulating and varying the amount of power transmitted through at least one of said more than-one power-transmitting means.

10. Means for avoiding destructive stresses of torsion when transmitting power between two shafts, comprising power-transmitting rotary means, carrying teeth, operatively connected with the first shaft, more than two power-transmitting rings, carrying teeth, operatively connected with the second shaft, the first teeth intermeshing with the second teeth to transmit said power, a plurality of drums supporting said rings and at least two rings being supported by one of said drums, the interior face of each drum not being in immediate contact with its shaft, and means for substantially equalizing upon the teeth of said rings the stress caused by transmitting said power.

11. Means for avoiding destructive stresses of torsion when transmitting power between two shafts, comprising power-transmitting rotary means, carrying teeth, operatively connected with the first shaft, more than two power-transmitting rings, carrying teeth, operatively connected with the second shaft, the first teeth intermeshing with the second teeth to transmit said power, a plurality of drums supporting said rings, and at least two rings being supported by one of said drums, the interior face of each drum not being in immediate contact with its shaft, at least one of said rings being operatively displaceable relatively to its drum.

12. Means for avoiding destructive stresses of torsion when transmitting power between two shafts, comprising power-transmitting rotary means, carrying teeth, operatively connected with the first shaft, more than two power-transmitting means, carrying teeth operatively connected with the second shaft, the first teeth intermeshing with the second teeth to transmit said power, means for substantially equalizing upon the teeth of said second means the stress of said transmission, and in the event of failure of part of said second means within a designed limit, the remainder of said second means being capable of receiving and of operatively transmitting all of said power.

13. Means for avoiding destructive stresses of torsion when transmitting power between two shafts, comprising power-transmitting rotary means, carrying teeth, operatively connected with the first shaft, more than two power-transmitting means, carrying teeth, operatively and resiliently connected with the second shaft, the first teeth intermeshing with the second teeth to transmit said power, and means for substantially equalizing upon the teeth of said second means the stress caused by transmitting said power, the adjusted resilience of the equalizing element being the means for attaining the substantial equalization.

14. In the transmission of power between two shafts, consisting of power-transmitting rotary means, carrying teeth, operatively connected with the first shaft, more than two power-transmitting means, carrying teeth, operatively connected with the second shaft, the first teeth intermeshing with the second teeth to transmit said power, the art of avoiding destructive stresses of torsion, by substantially equalizing upon the teeth of said second means the stress caused by transmitting said power.

GEORGE EDWARDS.

Copies of this patent may be obtained for five cents each, by addressing the "Commissioner of Patents Washington, D. C."